United States Patent [19]

Grice et al.

[11] 4,451,881
[45] May 29, 1984

[54] DATA PROCESSING SYSTEM BUS FOR MULTIPLE INDEPENDENT USERS

[75] Inventors: Donald G. Grice, Kingston; Frank E. Howley, Poughkeepsie, both of N.Y.

[73] Assignee: International Business Machines Corp., Armonk, N.Y.

[21] Appl. No.: 317,824

[22] Filed: Nov. 3, 1981

[51] Int. Cl.³ .................. G06F 3/04; G06F 15/16; G06F 9/46
[52] U.S. Cl. .................. 364/200; 370/85
[58] Field of Search ...... 364/200 M.S. File, 900 M.S. File; 370/85

[56] References Cited

U.S. PATENT DOCUMENTS

| | | | |
|---|---|---|---|
| 3,710,351 | 1/1973 | Nakamura | 364/200 |
| 3,983,540 | 9/1976 | Keller et al. | 364/200 |
| 4,050,097 | 9/1977 | Miu et al. | 364/200 |
| 4,159,518 | 6/1979 | Draper et al. | 364/200 |
| 4,209,838 | 6/1980 | Alcorn, Jr. et al. | 364/200 |
| 4,223,380 | 9/1980 | Antonaccio et al. | 364/200 |
| 4,271,465 | 6/1981 | Ohtsuka et al. | 364/200 |
| 4,281,380 | 7/1981 | De Mesa et al. | 364/200 |
| 4,281,381 | 7/1981 | Ahuja et al. | 364/200 |
| 4,313,196 | 1/1982 | Oblonsky | 364/200 |
| 4,320,457 | 3/1982 | Tanikawa | 364/200 |

FOREIGN PATENT DOCUMENTS 35731 9/1981 Fed. Rep. of Germany.
2074764 4/1980 United Kingdom.

OTHER PUBLICATIONS

"Multiprocessing with Single Board Computers–Hardware Consideration", Western Conf. Record., Sep. 18th–20th 1979, San Francisco, pp. 1–6.

Primary Examiner—Eddie P. Chan
Attorney, Agent, or Firm—W. S. Robertson

[57] ABSTRACT

A new bus permits processing elements (PE's) to communicate with other PE's entirely under the control of each PE without a separate bus controller. Each PE has means for broadcasting its priority code on a contention portion of the bus and for sampling the bus after a delay in which it has received the codes from other PE's. Each PE holds its priority code on the bus for a further delay during which other PE's can sample the priority code. The PE's resolve contention for access to the information portion of the bus in a multi stage contention sequence. System usage, made possible by peer-to-peer distribution of bus access control, includes dynamic driven priority schemes, a variety of operating modes and hence flexible multiplexing of message traffic.

12 Claims, 6 Drawing Figures

DATA PROCESSING SYSTEM BUS FOR MULTIPLE INDEPENDENT USERS

FIELD OF INVENTION

This invention relates to a system of interconnected processing elements (such as a processor, a data store, or a storage controller, and an I/O processor) and more specifically the invention relates to a new and improved bus and bus access control apparatus for such a system of processing elements.

INTRODUCTION
THE PRIOR ART

In data processing apparatus and systems of the type that this invention is useful with, a processor and a memory (as an example) are interconnected by means of a bus that carries addresses and data. The invention applies to any components or elements that might be interconnected on a bus, and for generality an element that is connected to the bus will be called a processing element or PE. The invention can be used with various kinds of busses that carry data and addresses or other forms of information such as status and control bits, and for generality the line or lines that carry these signals will be called the Information Bus.

Each PE has an address and it has conventional means for recognizing its address on the Information Bus and for accepting a message that is addressed to it. Each PE also has conventional means for producing an internal signal when it needs access to the Information Bus to send a message to another processing element. For example, a processing element might read a status signal that indicates that some action is required in which the Information Bus will be used. For generality, this local signal will be called NEED. A PE also has conventional means to place an address and data on the Information Bus with other synchronizing or control signals for communicating with other processing elements on the bus.

When several PE's are interconnected on a bus, a distributed contention or priority apparatus and protocol are provided in order to allocate access to the bus to the processing elements on a basis that includes a priority assignment for each PE. Usually, each PE is assigned a unique multi-bit code and the priority of the processing elements runs in the numerical sequence of the codes.

When a time for contention for access to the Information Bus has begun, the contending PE's signal each other their priority codes placing the code on a multi-line bus that will be called a Priority Bus. The Priority Bus can be separate from the Information Bus so that a priority resolution sequence for the Information Bus can take place while the Information Bus is being used by the highest priority contender from the preceeding contention period. Each contending PE compares its priority code with the priority code on the Priority Bus to detect whether a higher priority PE has placed its code on the bus. In this case, the local PE drops out of contention. See U.S. Pat. No. 3,983,540.

The prior art has suggested several techniques for permitting a PE to operate with a code that has bits longer than the number of lines on the Priority Bus in order that a large number of PE's can operate with a Priority Bus of only a few lines. See application Ser. No. 108,069 of J. G. Oblonsky for "Conflict Resolution Mechanism" filed Dec. 29, 1979 now U.S. Pat. No. 4,313,196 issued Jan. 26, 1982, and assigned to the assignee of this invention.

SUMMARY OF THE INVENTION

An object of this invention is to provide a new and improved system in which a large number of PE's use independent but identical apparatus and identical protocol to contend for access to an Information Bus. A related object is to provide a new and improved system in which it is particularly simple to increase (or decrease) the number of PEs or to increase (or decrease) the width of the data bus or to use PEs with unlike characteristics.

The contention apparatus of each PE provides three operating modes called TOP, GROUP and TASK. TOP MODE provides the familiar operation in which the highest priority contender receives access to the bus without regard to other factors. GROUP MODE provides the familiar operation in which all PEs that enter contention at the same time from a group and each element of this group is given access to the Information Bus before a next group of PE's is permitted to enter contention. TASK MODE is useful where a group of PE's cooperate for a particular task. These PE's are assigned a common task priority code (as part of the priority code) and are assigned further unique codes within the task group. In a first stage of contention the contending group with the highest task priority is identified, and in a subsequent contention stage the highest priority PE of the task group is given access to the Information Bus. All originally contending members of this task group are given access to the Information Bus in order of priority before contention is again opened to all PE's (as in GROUP MODE).

The priority code of a PE is arranged in three (e.g.) parts that will be called arbitrarily parts A, B and C, and the contention period proceeds in three stages also called stages A, B and C. (Three is an advantageous number for a particular number of PE's and a particular number of contention bus lines, and it illustrates the general case in which there are a selected number of contention lines N and a selected number of contention stages M to handle (N+1)M or fewer PE's.) In each stage, a contender places the corresponding part of its priority code on the Priority Bus. If a PE is NOT HIGH at any stage except the last, it drops out of contention for that sequence of contention stages. The single PE that is HIGH in the last stage (Stage C) is given access to the Information Bus next. In the GROUP MODE and TASK MODE other contenders in the last stage take access to the bus in order without a separate contention sequence. When the last of these contenders has received access to the Information Bus, any other contenders in the group may begin a new contention sequence.

In carrying out these operations, the PE's use two contention lines called CONTENTION 1 and CONTENTION 2 (CONT1) and (CONT2) and a line called RESOLUTION (RESOL). This invention includes timing means at each PE that compensates for delays in transmitting signals along these lines so that the system requires no separate synchronizing or supervisory means.

Other advantages and features of the invention will be introduced in the Description of the Preferred Embodiment of the invention.

THE METHOD AND APPARATUS OF THE DRAWING

Figure 1:
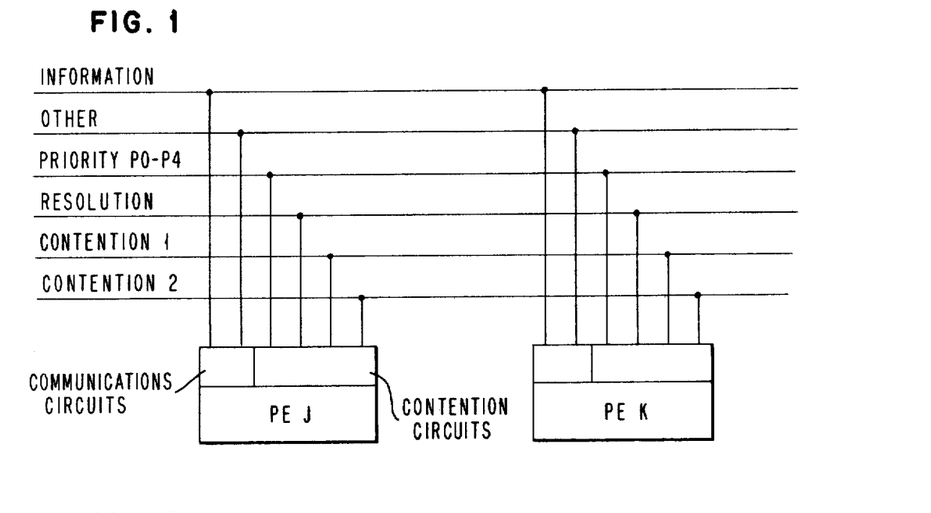
FIG. 1 is a block diagram of a system of processing elements using the bus system of this invention.

INTRODUCTION—FIG. 1

FIG. 1 shows two processing elements (PE's) that illustrate this invention. These PE's are individually designated J and K and are representative of a large number of PE's, for example up to a few hundred. A PE can be any component or subsystem that uses a bus to communicate with other components or subsystems. For example, it may be helpful to think of PE's J and K as each being a processor or equivalently as a processor that handles the communications for a terminal or a storage controller or the like.

The PE's have conventional asynchronous communication circuits to communicate on a bus that carries data and/or addresses, status, instructions and the like, and for generality this bus will be called the Information Bus. An Information Bus commonly has additional lines shown as another bus (called Other in the drawing) that carries control signals such as Valid and Acknowledge which will be referred to later. The invention is useful with a wide variety of communication systems of this general type.

Access to the bus by a PE is controlled by contention circuits that communicate on a priority bus having five (e.g.) lines designated P0–P4 and on three lines called RESOLUTION, CONTENTION 1 and CONTENTION 2. In addition, several signals are generated internally by each PE and the contention circuits. These components will be described as they appear in a sequence of descriptions of the signals and the associated operations.

SOME INTERNALLY GENERATED SIGNALS

"NEED" is an internally generated binary signal that tells the PE that access to the Information Bus is needed for some reason. A suitable signal is commonly available in any data processing apparatus that communicates with other apparatus. For example, a processor PE operates with instructions that include the address of any PE that the processor is to communicate with, and the microcode or other instruction decoding means of the processor includes a microstep that provides the signal that is called NEED. Such a signal is also commonly generated when a buffer store is full, when a terminal operator strikes the attention key, and so on.

TOP MODE, GROUP MODE and TASK MODE have been defined in the Summary of the Invention. The operating mode is defined in a register for each PE, either as a status bit for each of the three modes or as two bits that are decoded to provide a signal that identifies the current mode. This status register is addressable either directly or indirectly by a particular PE of the system and this PE executes a program to select an operating mode and to load the corresponding code into the register of each PE. Usually, the PE's will all operate in the same mode at the same time, but some mixed modes are useful. The mode can be changed as frequently as changes in the task of the system make it desirable to change the mode or the mixture of modes. Alternatively the mode can be selected and set by operating personnel or it can be set during manufacture to personalize an otherwise generalized system.

Similarly, each PE has a priority code register that holds the priority code that was described in the Summary of the Invention. This code is loaded into the register in the way described for the mode code.

Figure 2:
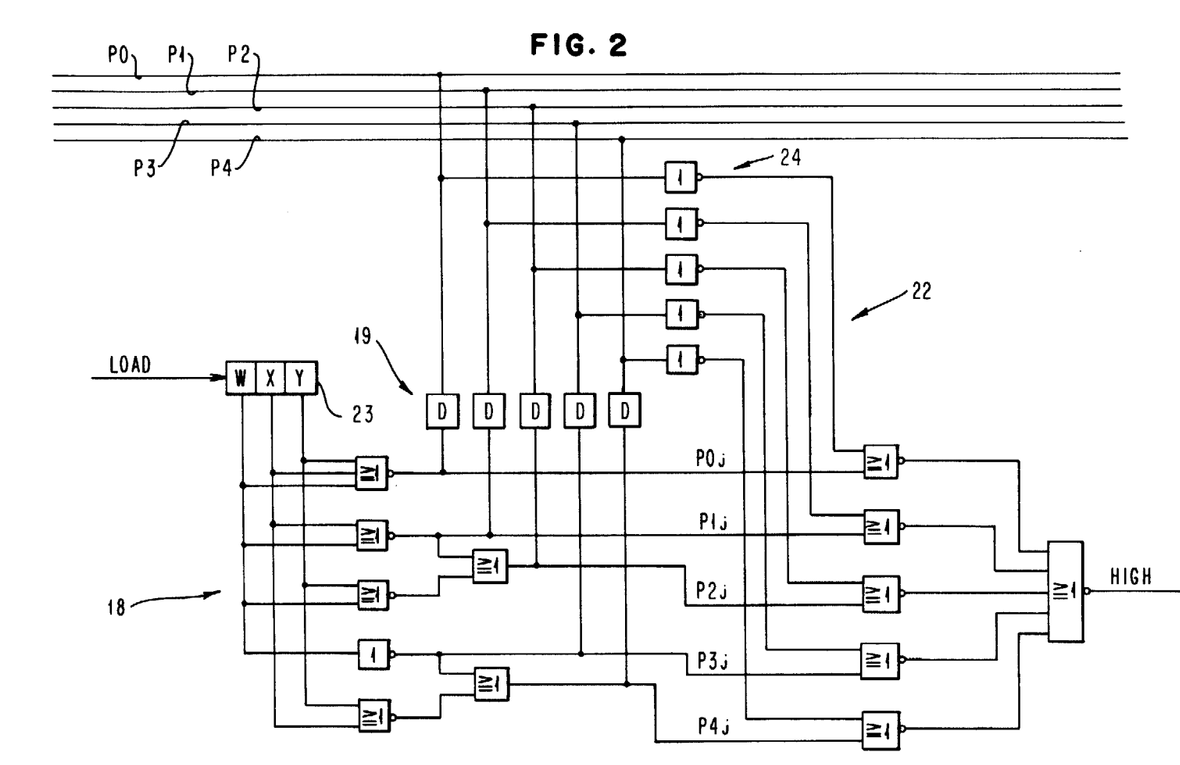
FIG. 2 is a schematic of a priority resolution circuit for each PE of the system of FIG. 1.

THE PRIORITY CIRCUIT—FIG. 2

This circuit compares the five bit local priority code ($P0j$ $P1j$ $P2j$ $P3j$ $P4j$) with the five bits P0 P1 P2 P3 P4 on the Priority Bus. Each of the 5 bits is formed by a circuit which can be thought of as a 15 bit circular shift register holding the 15 bit local priority code and producing as an output the five bits of a selected section. The circuit has drivers that isolate the signal on the line from the local signal and it has a circuit for detecting a five bit sequence. The circuit of the drawing performs these general functions and in addition encodes the local priority in order to reduce storage requirements.

In the circuit of FIG. 2, a group of components 18 form the local priority code, a set of drivers 19 apply this code to the five lines of the Priority Bus, and a group of components 22 compare the priority code on the bus with the local code and produce a signal HIGH when the local PE has high priority.

Components 18 form the five bit priority code from a three bit code that is supplied by a register 23. The three bits in the register are designated W, X and Y to illustrate the operation of the decoder. The decoder operates according to the following table.

TABLE 1

| W | X | Y | P0 | P1 | P2 | P3 | P4 | Meaning |
|---|---|---|----|----|----|----|----|---------|
| 0 | 0 | 0 | 1 | 1 | 1 | 1 | 1 | highest priority |
| 0 | 0 | 1 | 0 | 1 | 1 | 1 | 1 | |
| 0 | 1 | 0 | 0 | 0 | 1 | 1 | 1 | |
| 0 | 1 | 1 | 0 | 0 | 0 | 1 | 1 | |
| 1 | 0 | 0 | 0 | 0 | 0 | 0 | 1 | |
| 1 | 0 | 1 | 0 | 0 | 0 | 0 | 0 | lowest priority |
| 1 | 1 | 0 | 0 | 0 | 0 | 0 | 0 | not used |
| 1 | 1 | 1 | 0 | 0 | 0 | 0 | 0 | not used |

In Table 1, the highest priority assignment is the five bit code 11111. From a more general standpoint, a one bit is represented by either an up level or a down level whichever will write over lower priority codes on the Priority Bus which in turn depends on the form of the line driver.

The circuit 18 that forms the five bit code can be understood from an example. Suppose that the PE has the priority code P0 P1 P2 P3 P4=00111 and the corresponding encoded three bits W X Y=010. The 1 bit in register position X produces a zero bit at the output of each OR invert circuit that it forms an input to, specifically the two OR invert circuits that produce priority bits P0i and P1i. The other gates receive all zero inputs and produce 1 outputs at lines P2i P3i and P4i.

When the PE is not placing its priority code on the Priority Bus, it degates the drivers or loads register 23 with W, X, Y = 101 or performs some equivalent operation.

The compare circuit 22 can be understood easily by first considering the situation in which there are no other signals on the Priority Bus and the circuit compares the local priority code with the same code which is read from the Priority Bus. Inverters 24 invert the logic values read from the Priority Bus. In the compare circuit, an OR invert circuit for each bit of the priority code receives the corresponding bit of the local priority code and the signal from the corresponding line of the Priority Bus. In this example in which there is no other signal on the Priority Bus, each OR invert circuit receives a one bit either from the local priority code as for bits P2$i$, P3$i$, P4$i$ = 111 or the complement from the line, Not P0, Not P1 = 11. In this example, each OR invert circuit receives a one bit and produces a 0 output bit. The operation of the circuit with other priority codes on the Priority Bus can be understood from the following table.

TABLE 2

| Table Row | Pj | Pk | P | NOT P | Meaning | NOT HIGH j |
|---|---|---|---|---|---|---|
| 1 | 0 | 0 | 0 | 1 | PNj = PNj | 0 |
| 2 | 0 | 1 | 1 | 0 | PNk HIGH | 1 |
| 3 | 1 | 0 | 1 | 0 | PNj HIGH | 0 |
| 4 | 1 | 1 | 1 | 0 | PNj = PNJ | 0 |

The notation P in the table identifies any one of the five priority lines.

It will be apparent that these functions can be achieved by various logic configurations.

Figure 3:
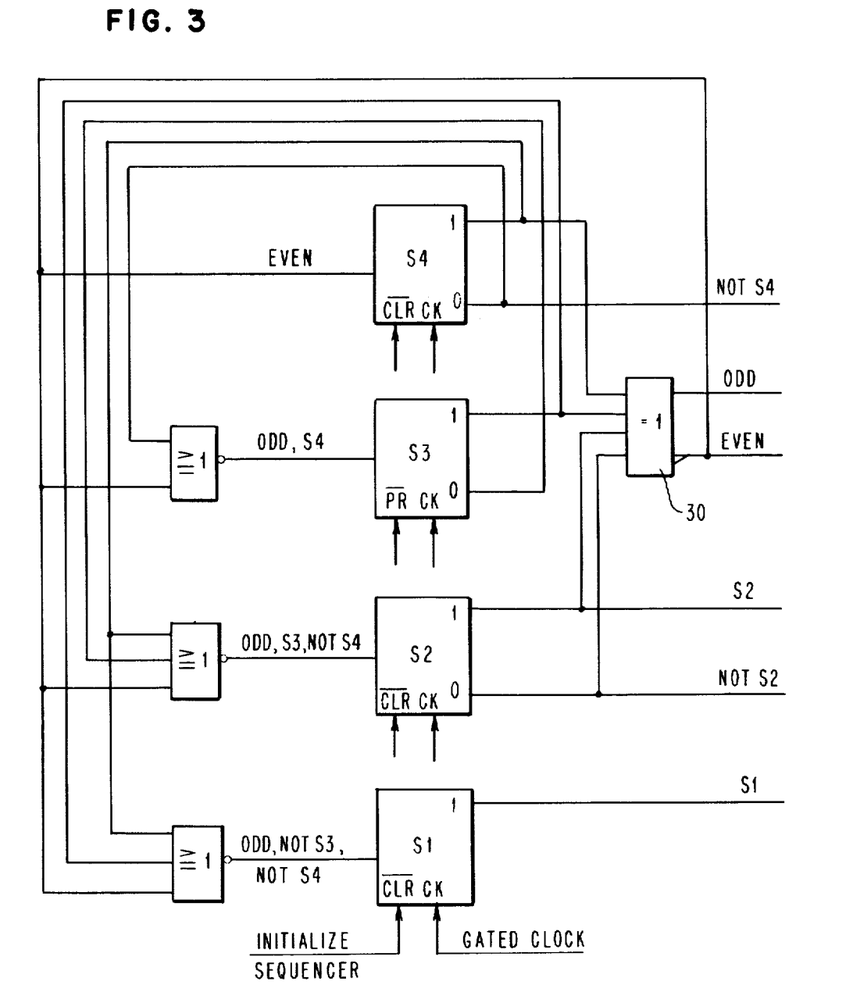
FIG. 3 is a schematic of a sequencer circuit for each PE of the system.

THE SEQUENCER—FIG. 3

The sequencer circuit of FIG. 3 includes a Gray code counter having four stages designated S1, S2, S3 and S4. The outputs of the stages are identified by the stage designation or its complement. Since a Gray code counter changes only one bit position during a counting transition, the parity of the count alternates like the low order bit of a conventional binary counter and an Exclusive OR circuit 30 produces this signal, designated ODD, and its complement EVEN. These outputs are simpler to decode than the outputs of a Gray counter or a binary counter.

The four counter stages count through sixteen states (some of which are unused) in response to an input pulse from a conventional clock at an input CK. It will be convenient to designate a state in the form S1S2S3S4 (EVEN), for example, S1S2S3S4 (EVEN)=0010(0) for state or step 1. Table 3 shows the sequence of states including the unused states.

TABLE 3

|   | Step | S1S2S3S4 (EVEN) |
|---|---|---|
| (reset) | 1 | 0010 (0) |
|   | 2 | 0110 (1) |
|   | 3 | 0111 (0) |
|   | 4 | 0101 (1) |
|   | 5 | 0100 (0) |
|   | 6 | 1100 (1) |
|   | 7 | 1101 (0) |
|   | 8 | 1111 (1) |
|   | 9 | 1110 (0) |
|   | 10 | 1010 (1) |
|   | 11 | 1011 (0) |
|   | 12 | 1001 (1) |
|   | 13 | 1000 (0) |
|   | 14 | 0000 (1) |
|   | 15 | 0001 (0) |

TABLE 3-continued

| Step | S1S2S3S4 (EVEN) |
|---|---|
| 16 | 0011 (1) |

The details of the operation of the counter can be readily understood from the drawing and the preceding table of the steps. As an example, consider the operation during step 1, state 0010 (0) to advance to step 2, state 0110(1). Latch S4 responds to the signal EVEN which is down in step 1 and thus latch S4 maintains its state for step 2. Latch S3 responds to the coincidence of the signals ODD which rises in step 2 and S4 which remains down in step 2 and latch S2 also maintains its state. Latch S2 responds to ODD, S3, and NOT S4, each of which is up during step 1, and latch S2 changes state. Latch S1 retains its state because one of its inputs, NOT S3, is down.

Each count of the sequencer corresponds to a step in the contention sequence. Step 1 is a reset step in which all operation of the contention circuit are inhibited. A reset pulse on a line Initialize Sequencer causes stages S1, S2 and S4 to reset to zero and stage S3 to set to one. (Both the clock line and the reset line are shown broken in FIG. 3 to simplify the drawing.) The sequencer is reset or initialized when it drops out of a contention sequence or when it has received access to the Information Bus as a result of winning a contention sequence, as will be explained in more detail later.

The clock is gated to advance the sequence from one step to the next or it is stopped while a delay operation of several clock cycles is performed and then is gated on to advance the counter to the next step.

The operation of the sequencer, the clock gating circuit, and the reset circuit will be explained further as these components appear in other operations of the invention.

RESOLUTION

"RESOLUTION" signals that the Information Bus is busy, and to this extent the signal is conventional. A PE raises RESOLUTION when it begins transmitting on the Information Bus and it drops RESOLUTION when its transmission has been completed. In most systems, when a PE raises RESOLUTION it begins a process to make a logical connection to the receiving PE. The transmitting PE may raise a conventional signal VALID on the Other Bus to signal that the information bus is stable. In most systems, before a PE drops RESOLUTION it goes through a termination sequence in which the receiving PE acknowledges that it has received the message by raising a signal line ACKNOWLEDGE on the Other Bus, and the transmitting PE then acknowledges this signal by dropping VALID. From these comments it will be apparent that many components of the signal RESOLUTION are available in conventional systems.

A contention sequence can take place while the Information Bus is in use, but a new contention sequence can begin only when CONTENTION 1 is down. A PE that needs access to the Information Bus (NEED=1) begins a contention sequence by placing its priority code on the Priority Bus when it senses that CONTENTION 1 is down, (other signals are sensed and other operations take place, as will be described.)

Other components of the signal will be described later.

Figure 4:
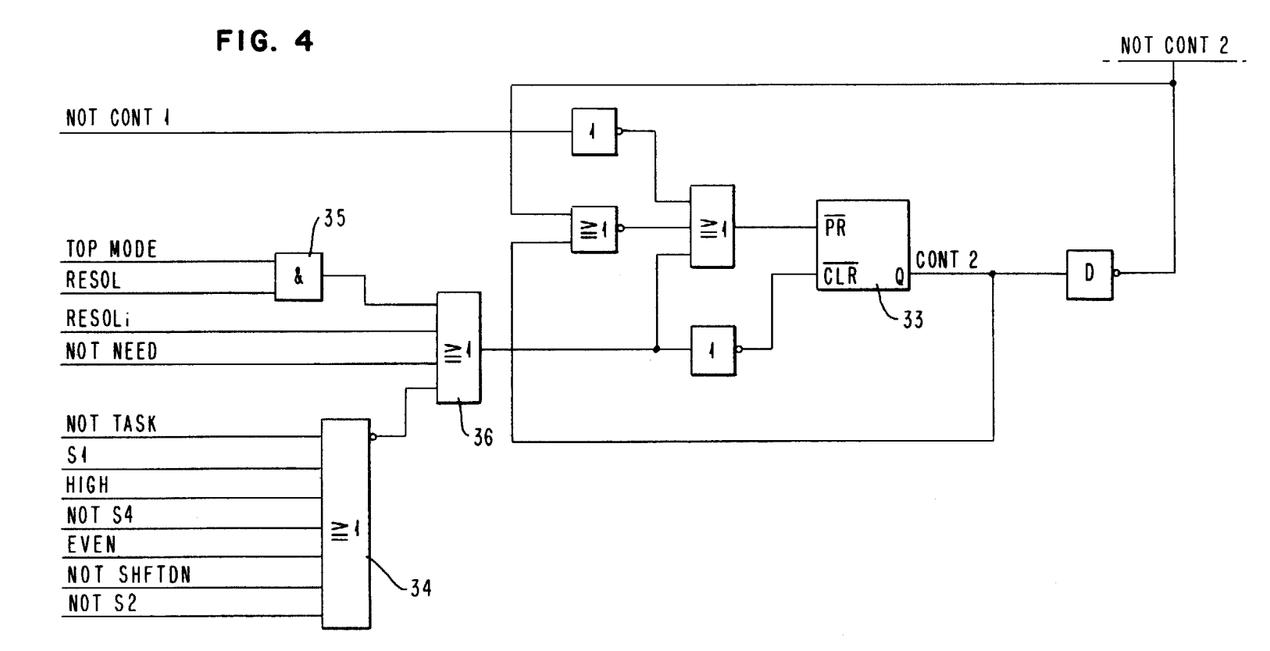
FIG. 4 is a schematic of a circuit for each PE for forming the signal CONTENTION 2.

CONTENTION 1 AND CONTENTION 2—FIG. 4

A PE raises CONTENTION 1 (and also CONTENTION 2) when NEED=1, CONTENTION 1 and CONTENTION 2 are both down, or CONTENTION 1 is down and CONTENTION-2$j$ is up. (In the specific implementation that is being described the PE advances to step 2 in response to this logical product and raises CONTENTION 1 and CONTENTION 2 in response to the controller signals that identify Step 1.) A PE drops CONTENTION 1 (but not necessarily CONTENTION 2) if it is NOT HIGH in any contention stage except for Stage C. The PE that is HIGH at the end of Stage C drops CONTENTION 1 (and CONTENTION 2) after it has received access to the Information Bus and has raised RESOLUTION. The more complex operation of a PE that is NOT HIGH at Stage C will be described later.

In the preferred apparatus, the signal CONTENTION 1 is formed as the logic sum S1+S2 at the output of the sequencer and thus is up from the beginning of Step 2 through Step 11 and falls when the sequencer is reset to Step 1. (See Table 3.)

CONTENTION 2 is raised with CONTENTION 1 and it is dropped by a PE on access to the Information Bus on the same conditions that cause a PE to drop CONTENTION 1, but a PE that is NOT HIGH drops CONTENTION 2 under different conditions that depend on the operating mode. In TOP MODE, a PE drops CONTENTION 2 whenever CONTENTION 1 is dropped. In TASK MODE a PE drops CONTENTION 2 if it is NOT HIGH at Stage A. After a PE in TASK MODE enters Stage B of contention, it keeps CONTENTION 2 up until it receives access to the Information Bus and raises RESOLUTION. A PE in GROUP MODE does not drop CONTENTION 2 until it has received access to the Information Bus.

To look ahead in this description, the system of this invention uses CONTENTION 1 and CONTENTION 2 in GROUP MODE or in TASK MODE to distinguish between PE's that have lost contention at an earlier stage (which have dropped CONTENTION 1) and PE's that are not in contention. Contention proceeds between all PE's at Stage C until each of these PE's has received access to the Information Bus and dropped CONTENTION 1. Then the group contention sequence begins with Stage A for all remaining members of the group.

FIG. 4 shows the preferred logic circuit for forming CONTENTION 2. (The contention bus line CONTENTION 2 is shown its complement form to accommodate a particular line driver arrangement as already explained.) A latch 33 is set to raise CONTENTION 2 whenever CONTENTION 1 is raised and it is reset when CONTENTION 1 falls under conditions that are controlled by the inputs to gates 34, 35 and 36. The inputs to gate 34 permit CONTENTION 2 to fall with CONTENTION 1 if the PE is in TASK MODE and is NOT HIGH in Stage A. The logic sum NOT TASK-+HIGH=0 signals that the PE is in TASK MODE and is NOT HIGH. The sum S1+NOT S2+NOT S4+EVEN=0 defines Step 3 and NOT SHIFTDONE=0 defines the sample time at the end of Delay 1. The inputs to gate 35 permit CONTENTION 2 to fall with CONTENTION 1 when the PE is in TOP MODE except if RESOLUTION is up. This condition permits the highest PE to take control of the Information Bus and permits the next highest PE to receive priority immediately afterwards without going through the contention sequence, as in TASK or GROUP MODE. The other inputs to gate 36 permit CONTENTION 2 to fall with CONTENTION 1 if NEED drops (for example if the PE terminates the contention sequence for some reason) and also after the PE raises RESOLUTION and has taken control of the Information Bus. The functions can be arranged in various ways and in many different logic circuits.

Figure 5:
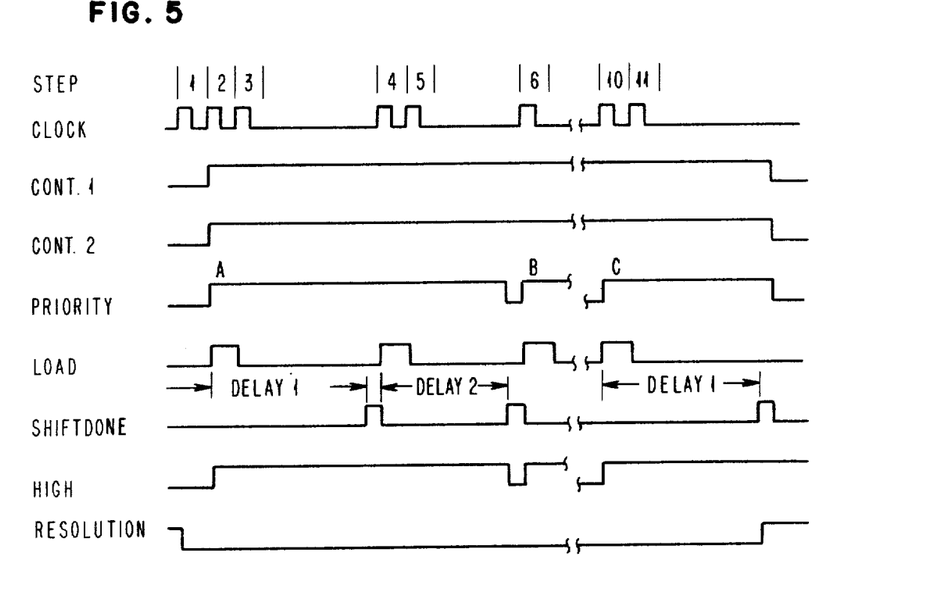
FIG. 5 is a timing chart illustrating an operation of the circuit.

AN INTRODUCTORY EXAMPLE—FIG. 5

The major signals and circuits have now been introduced and it will be helpful to consider the operation for the very simple example in which PE J is the only contender and that RESOLUTION is down. J is at step 1 in which the sequencer is reset. In response to the logical product NEED and NOT CONTENTION 1 and NOT CONTENTION 2 and NOT RESOLUTION=1, J advances the sequencer to step 2. In response to the sequencer signal 0110 (1) for step 2, J puts its stage A priority code on the Priority Bus, raises CONTENTION 1 and CONTENTION 2 and loads its delay counter with the count value for DELAY 1. The clock remains gated and the sequencer receives a clock pulse to advance to step 3. In response to the sequencer signal 0111 (1) the clock gate is closed and J waits for the interval in which signals from any other PE would become stable at its priority circuit.

The signal HIGH rises when J enters its priority code on the Priority Bus, and it is up at the end of DELAY 1 when SHIFTDONE rises. J samples the priority bus signal HIGH and would reset the sequencer in response to the logic product NOT HIGH and Step 3=1. In this example J is HIGH and the clock gate is opened and the sequencer advances to step 4 with the next clock pulse. In response to the sequencer signal 0101 (1) that identifies step 4, DELAY 2 is loaded into the delay counter and the clock is advanced to step 5. After this time delay, SHIFTDONE rises and the clock is gated to advance the sequencer to step 6 to begin Stage B of the contention sequence.

Stage B of the contention sequence is performed in sequencer steps 6, 7, 8 and 9 that correspond directly to steps 2, 3, 4 and 5 of stage A except that the Stage B priority code is used in Stage B. Similarly, in Stage C J places its Stage C priority code on the Priority Bus, and loads DELAY 1 in step 10, and in step 11 J waits for the local signal to stablize and for SHIFTDONE to rise. When SHIFTDONE rises at the end of step 11, J samples the logic product Step 10 and SHIFTDONE and HIGH and NOT RESOLUTION=1. On this condition J first raises RESOLUTION and then resets its sequencer and thereby drops CONTENTION 1 and CONTENTION 2 and its priority code.

Notice that if the Information Bus is busy and NOT RESOLUTION=0, J waits for RESOLUTION to fall (keeping CONTENTION 1 and CONTENTION 2 and SHIFTDONE up and keeping its priority code on the Priority Bus) and thereby prevents another contention period from starting.

AN EXAMPLE WITH TWO PE'S

Suppose that both J and K are in contention and that they have equal priority codes for Stages A and B but that J has the higher priority code in Stage C. J operates in the way described for FIG. 5 and samples the Priority Bus when it is stable and finds that it is HIGH. J then raises RESOLUTION and drops its priority code as already explained.

K does not reset in Stage C as a losing PE resets in Stages A and B. Instead, K reads the product HIGH & SHIFTDONE & NOT RESOLUTION=0 and waits for RESOLUTION to fall before taking access to the Information Bus, just as in the previous example in which J as a single contender found RESOLUTION up at the end of Stage C and waited for RESOLUTION to fall. In this example K takes access to the Information Bus when J completes use of the Information Bus and drops RESOLUTION. (In TOP MODE a losing PE ordinarily resets at step C except as described in relation to FIG. 4.)

Figure 6:
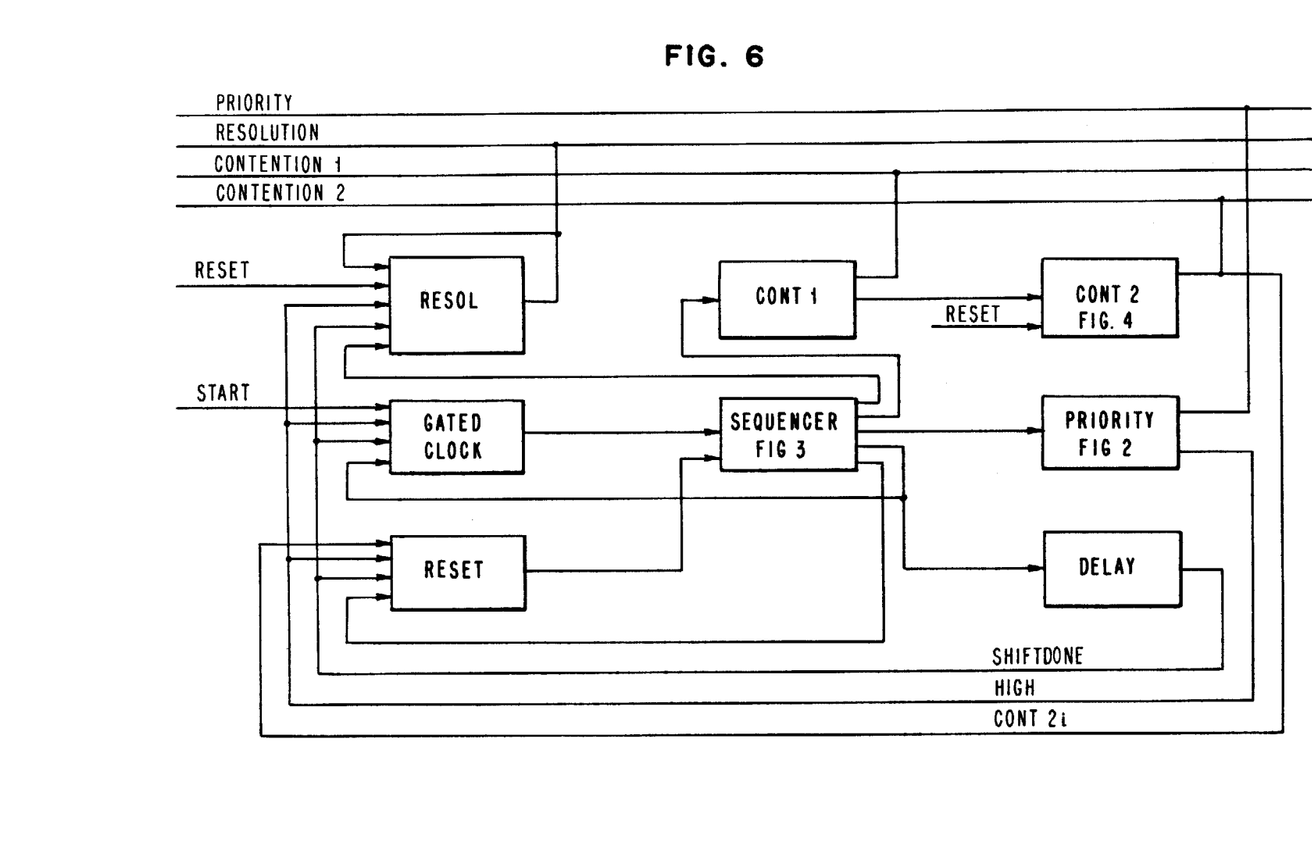
FIG. 6 is a block diagram showing the interconnection of components of the system of one PE.

LOGIC SUMMARY—FIG. 6

FIG. 6 is an overall view of components that have been described in detail already and some components that have been introduced and can now be further explained in relation to the other components. The following table will be helpful in this summary.

TABLE 4

| Step | Operation |
|---|---|
| 1 | Initial or Reset State |
| 2, 6, 10 | Load DELAY 1, Enter Priority Code A, B or C |
| 3, 7, 11 | Wait, sample Priority Bus, Reset at Step 3 or 7 if NOT HIGH |
| 4, 8 | Load DELAY 2 |
| 5, 9 | Wait |

The functional block DELAY has inputs from the sequencer to load the counter with the appropriate delay at particular steps and also to reset the delay counter when the sequencer is reset. The signal to load DELAY 1 on steps 2, 6 and 10 is S4 and ODD=1, as can be seen from Table 3. The signal to load DELAY 2 at steps 4 and 8 is S2 and S4 and ODD=1. Similarly, the counter is reset on 0010 (0) or other available condition that signals that the sequencer is being reset. Notice that SHIFTDONE stays up at step 11.

The signal from the sequencer to the priority circuit to enter the Stage A code is produced by the sequencer at step 2 according to its state output S1S2S3S4 (EVEN)=0111 (0), and the signals to enter Stage B code and enter Stage C code are similarly formed as 1101 (0) and 1011 (1) respectively. The priority circuit also receives the sequencer code for step 1 0010 (1) to drop the priority code from the Priority Bus, as has already been explained.

A Reset Circuit receives the signals from the Sequencer, the Delay circuit and the priority circuit to reset the sequencer on NOT HIGH and SHIFTDONE at steps 3 and 7. These steps are defined by S2 and S4 and ODD=1 or equivalent signals from the sequencer. After Stage C, reset occurs only on the complement of the local signal CONTENTION 2i, which falls after a PE in GROUP MODE or TASK MODE has received access to the Information Bus and after a PE in TOP MODE has either received access to the Information Bus or has otherwise dropped CONTENTION 2 as already explained. (CONTENTION 2i is isolated from CONTENTION 2 by means of a driver as shown in FIG. 2 but not set out in FIG. 6.)

The Gated Clock has a conventional oscillator that supplies the pulses to advance the sequencer and also supplies the pulses for the delay counter. As represented by the signal START, the Clock is gated at NEED and only in TOP MODE and NOT CONTENTION 1 and NOT CONTENTION 2=1 to advance the sequencer to step 2 to start a contention sequence. It also receives signals from the sequencer to advance the sequencer automatically after each load step (steps 2, 4, 6, 8 and 10) on LOAD and EVEN =1. It receives a signal from the Delay circuit to advance the sequencer after steps 5 and 9 on NOT S4 and ODD and SHIFTDONE=1. It also advances from steps 3 and 7 in response to HIGH and S4 and ODD and SHIFTDONE=1 unless it is reset.

In the RESOLUTION circuit a latch is set on HIGH and SHIFTDONE and step 11 and NOT RESOLUTION as already explained. The latch is reset when signals otherwise formed by the PE indicate that the use of the Information Bus has been completed, for example when VALID falls on the Other Bus.

The particular signals that have been used to indicate the conditions have been chosen for reasons of circuit optimization and equivalent signals or alternative optimization will be readily apparent.

A FURTHER DISCUSSION OF OPERATION

Suppose that several PE's J, K, L . . . are operating in TOP MODE and each needs access to the Information Bus but that RESOLUTION, CONTENTION 1 and CONTENTION 2 are up. When these signals fall, those PE's begin a contention sequence in which J for example wins and K drops out in Stage B and resets and L drops out in Stage C and also resets. (The contention circuit is designed to run fast enough so that it normally completes while the Information Bus is still busy and RESOLUTION is still up at step 11, except in TOP MODE.) When RESOLUTION falls, J takes access to the Information Bus and begins transmitting a message. While RESOLUTION is down, K and L and any other PE's that need access to the Information Bus begin a new contention sequence. In TOP MODE this sequence is open and is independent of whether a PE was in the previous contention sequence.

In GROUP MODE the PE's that enter contention reset but do not drop CONTENTION 2 when they drop out of contention at Stage A or B. In addition, all the PE's that reach stage C remain in stage C until they have received access. Then CONTENTION 1 falls and (usually later) RESOLUTION falls and, if there are still members of the group holding up CONTENTION 2, a new contention period starts at stage A for only those PE's with CONTENTION 2 up.

The operation in TASK MODE can be understood by considering stage A as an operation in TOP MODE in which PE's that have been assigned the same Stage A priority code contend as a group. The group that wins in Stage A proceeds to Stage B and the losers reset and drop both CONTENTION 1 and CONTENTION 2 as in TOP MODE. Thereafter, contenders that drop out in Stage B keep CONTENTION 2 raised and thereby form a group of PE's that receive access to the Information Bus before the next open contention period. (Alternatively, the losing PE's can drop out in both Stage A and Stage B to permit a larger number of smaller groups.)

COMMUNICATIONS BETWEEN PE'S

When a PE has access to the Information Bus it places on the bus in a predetermined format the address of the receiving PE, the address of the sending PE, a control word, and a variable portion of the message.

The variable portion can contain data, instructions and the like. The fixed portion of the message can include other conventional fields such as error correction bits, a storage protect key and the like.

The control word has one bit position that identifies a non-supervior or a supervisor mode. Supervisor mode is used to control the execution of privilege instructions as is conventional for many data processing systems. In the system of this invention, supervisor mode is also used for executing instructions to load the priority register and to set the mode bits that have been described already. That is, the receiving station will not respond to an instruction to set its mode bits or to set its priority bits unless the sending station is operating in supervisor mode as signaled by this bit position of the control word. Additional bits in this field may define several privilege states as is conventional in some data processing systems.

The control word also has a bit that permits the receiving station to hold up RESOLUTION so that the receiving station has control of the information bus for a response message without going through the contention sequence to gain access. This feature is useful for example where a PE fetches data from a fast memory that can respond with minimal delay. It would not be used ordinarily with a slow electro-mechanical storage device that usually has a significant delay between the receipt of a command to transfer data and the transfer of the first byte.

The control word also has a priority code for the sending PE. As an example, a code of three bits establishes eight priority levels. When a PE receives a message from another PE that requires the receiving PE to perform some operation, the receiving PE can enter the information into a queue according to the priority of the sender. If there are higher priority jobs waiting to be done by the receiving PE, the receiving PE can ignore the bit that permits it to respond without going through contention for the Information Bus and can take its jobs in order of priority.

The PE's can combine the supervisor mode bit with the priority field in a way that is analogous to the operation of some data processors. Some processors have interrupt levels and handle jobs in the order of the priority level that the interrupt occurs on. In some of these systems there are two programs per interrupt level, one that does a user's job and is not privileged and one that is privileged and performs operating system functions for the user's program on the same interrupt level. This capability is provided in the system of this invention by the combination of the priority field and the supervisor mode field in the message format.

In operations in task mode it is advantageous to arrange for the B and C stage priority codes (and further stages if required) to uniquely identify each PE so that the stage A code can be used as a variable priority code for task mode. (The operation to get access to the bus in Task mode is not changed from the previous description.) A PE can then load its stage A priority code register with the priority of the sending station that it is responding to. For example, if a PE has completed a job for a sending PE having a priority code of 2, it loads a 2 into its stage A priority register and contends for access to the Information Bus as part of task group 2. If the next highest priority job for this PE is at priority level 5, it changes its task group designation to group 5 and thus contends at a lower level of priority for access to the bus. If this PE receives a message from a PE with priority 4 while it is waiting for access to the bus as part of task group 5, it interrupts the level 5 job and performs the level 4 job and responds to the level 4 PE as a member of task group 4.

For example, a PE could do housekeeping jobs for a magnetic disk storage device at a low priority level and could be interrupted to perform active data transfer operations when a job of higher priority was to be done.

The Information Bus can be of any suitable width or parts of it can be wider than other parts or parts can be increased or decreased in width. Information can be put on the Information Bus in any format, for example blocks of the fixed format can be followed in time by blocks of the variable portion or blocks of various types can be transmitted in parallel depending on the width of the bus and the width of the data paths of the sending and receiving PE's. If a PE has a wider data path than the bus, it breaks its messages into bus width wide blocks as is conventional in other bus systems. A PE must similarly place its message on the lines of the bus that are connected to the receiving PE. This information is kept in tables in the processing elements and it can be provided by personnel who install the PE's or, preferably, it is transmitted as part of a message on the bus. For example, a newly added PE can broadcast its configuration to other PE's or this information can be supplied with an individual message.

SUMMARY

The system that has been described provides a number of advantages from the fact that the PE's operate independently of a bus controller. For example, the system is easily expandable (or contractable), both by adding more components (or subtracting components) in an existing installation and by modifying a design to have a different Information Bus structure or to have more or fewer stages in the contention sequence. The multiple mode operation is particularly useful in a bus system having a large number of PE's and also having a variety of tasks or a variety of applications.

Those skilled in the art will recognize many applications for the system of this invention and appropriate modifications within the spirit of the invention and the scope of the claims.

Having thus described our invention, what we claim as new, and desire to secure by Letters Patent is:

1. A bus system for a plurality of processing elements (PE's) comprising,
   an Information Bus and means connecting each PE to communicate on the Information Bus,
   1a multi line priority bus for use in determining priority among a group of PE's contending for access to said Information Bus, means in each PE for providing a unique multi bit priority code, means in each PE for defining a sequence of contention stages, including a first stage for which one or more PE's initiate a contention sequence and a last stage in which one contending PE is assigned access to said Information Bus, means in each PE operable at each stage to put a corresponding part of said priority code on the priority bus and means in each PE to compare the code part of the PE with code parts of other PE's on the bus during the same stage of contention and to signal the PE to drop out of the contention sequence if it is NOT HIGH,
   a further plurality of lines for use in defining a group composed of PE's that initiate a contention sequence, one or more contention sequences among members of a group constituting a group contention period, and for use in allowing access to said priority bus to all members of the group (GROUP MODE) or a selected one (TOP MODE) or selected ones (TASK MODE) of a group during a group contention period and means in each PE for signalling on a first of said further plurality of lines (RESOLUTION) its use or non-use of the Information Bus and for signalling on a second of said lines (CONTENTION 1) that it is in a process of contention for access to the Information Bus and for signalling on a third of said lines (CONTENTION 2) that it is contending as a member of a group to be given access to the bus during the group contention period means in each PE for detecting the corresponding signals of other PE's on said further plurality of lines and means in each PE responsive to said detecting means and operable when a PE is a member of the group to inititate a next contention sequence on the fall of the signal on said first and second lines, and means to prevent a PE from entering contention during a group contention period unless it is a member of the group initiating the sequence, whereby each PE handles access to the bus equally without a separate controlling element.

2. The system of claim 1 including means in one of said plurality of PE's for assigning to each PE one of said operating modes (TOP, GROUP, TASK) and wherein each PE has means responsive to said one PE for selectively defining a GROUP mode of contention, means in each PE to raise a signal on said third line on entering contention in Group Mode and for dropping said signal on its third line when it has received access.

3. The system of claim 2 wherein each PE has means responsive to said one PE for selectively indicating said TASK mode of contention, and means operable in said TASK mode for a PE to drop out of contention if NOT HIGH in said first contention stage and for thereafter operating during a group contention period in GROUP mode.

4. The system of claim 3 wherein each PE has means selectively indicating said third operating mode (TOP MODE) and means responsive to operation in said TOP MODE to drop out of contention when the priority is NOT HIGH in any stage of the contention sequence.

5. The system of claim 4 in which said one PE includes means for assigning some of the said PE's in said TOP mode and other of said PE's in said GROUP mode for the same contention sequence.

6. The system of claim 3 wherein each PE has means operable in said TASK mode or GROUP mode in said last of said contention stages to hold its priority code on said Priority Bus until it has received access to said Information Bus.

7. The system of claim 1 wherein said means for detecting signals of other PE's includes, for each PE, means for sampling the Priority Bus after a first time delay that is sufficient for the receipt of a corresponding priority code part from any other PE.

8. The system of claim 7 wherein each PE has means for holding its priority code on the line during a second time delay following said first time delay to permit each other PE to receive the priority code at the end of its first time delay.

9. The system of claim 3 wherein a PE has means for sending a message to a receiving PE including a message priority code and the receiving PE has means for operating on a plurality of received messages in a priority sequence and said receiving PE has means to set its first stage priority code according to the message priority when responding to a sender of said message, whereby priority for contention for the Information Bus is related to priority for a message to be sent.

10. The system of claim 1 including means for a receiving PE to signal on said RESOLUTION line that the Information Bus is in use for responding to a sending PE without contention for the Information Bus by the receiving PE.

11. The system of claim 10 wherein a sending PE has means to signal a receiving PE to enable a receiving PE to maintain control of the Information Bus for a response message.

12. The system of claim 11 wherein a sending PE has means for sending a message priority code with a message and wherein a receiving PE has means for responding to a plurality of messages in the order of priority, including means for responding or not responding to a signal enabling the receiving PE to maintain control of the Information Bus.

* * * * *